Nov. 23, 1971 CHUWAN KANG 3,621,807
AUTOMOBILE PARKING GUIDE
Filed Nov. 23, 1970
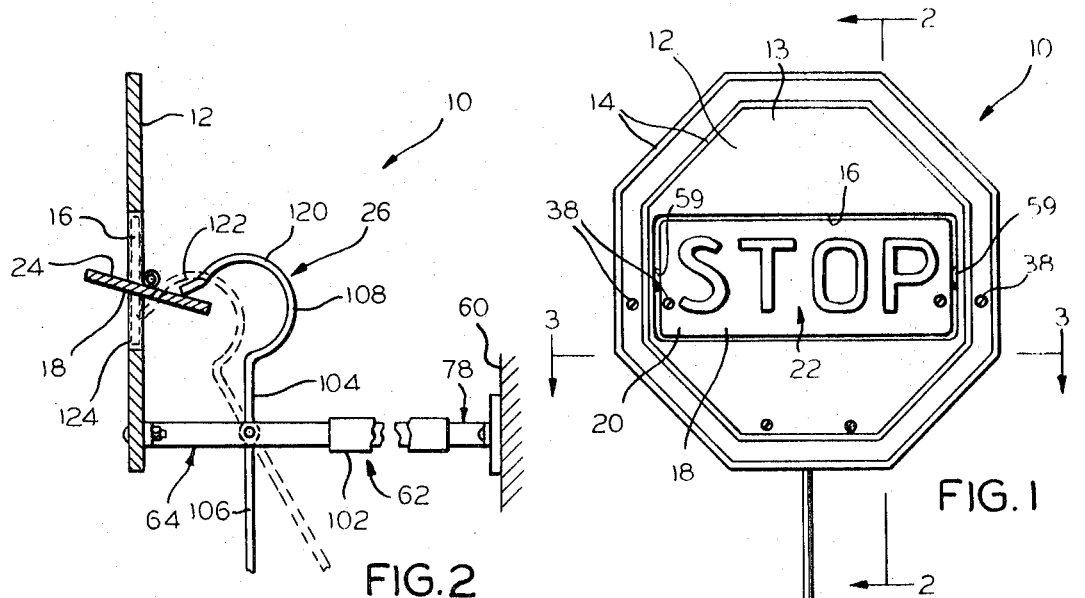
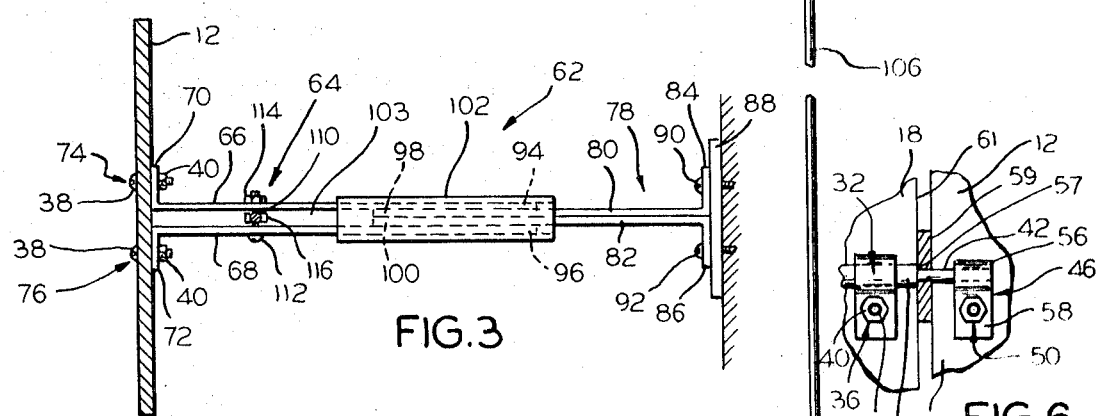
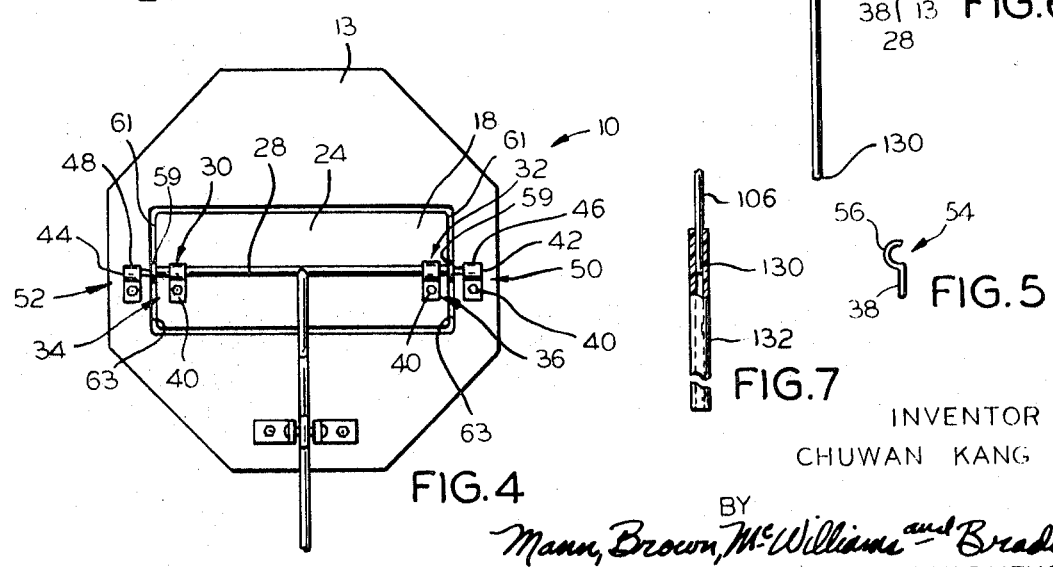
INVENTOR
CHUWAN KANG
BY
Mann, Brown, McWilliams and Bradway
ATTORNEYS United States Patent Office 3,621,807
Patented Nov. 23, 1971

3,621,807
AUTOMOBILE PARKING GUIDE
Chuwan Kang, 2301 Ridgeway Ave.,
Evanston, Ill. 60201
Filed Nov. 23, 1970, Ser. No. 91,762
Int. Cl. B60q
U.S. Cl. 116—28          8 Claims

ABSTRACT OF THE DISCLOSURE

A guide device for parking an automobile or the like to dispose its front or rear bumper at a predetermined distance from the inner end wall of a garage or the like comprising a sign in the form of a hex-shaped member mounted on the wall in spaced relation therefrom and about level with the vehicle operator's line of sight and having a window opening formed in its midportion in which a slat is mounted for swinging movement about a horizontal axis at its midportion, with the slat being balanced such that under the action of gravity, it is disposed substantially edgewise to the plane of the sign. The slat bears the word "stop" on its normally downwardly facing surface, and its other surface is engaged by an arced arm of a feeler member pendantly mounted at the rear of the sign that includes a shank adapted to be engaged by the vehicle bumper such that as the bumper is advanced toward the wall after engaging the feeler member, the slat is tilted into alignment with the plane of the sign to indicate that the desired spacing of the bumper from the wall has been reached.

---

This invention relates to a guide device for enabling one to consistently park an automobile or the like relative to the inner end wall of a garage or the like such that a predetermined spacing will exist between the wall and the vehicle bumper. More partticularly, the invention relates to a car spotting device to enable its driver to readily and consistently park his car in his garage leaving a predetermined spacing between the car bumper (front or rear, as desired) and the garage end wall.

The garage of the average home owner also frequently serves as a workshop or a place to store equipment and the like, which require that the family car be spaced from the garage inner end wall in order to provide access between either side of the garage and/or to protect what is stored along the garage inner end wall. When the car is being parked, since its bumper is out of the line of vision of the driver as the driver sits in the car driver's seat, it has proved difficult for most drivers to consistently stop, for instance, forward movement of the car so that at least the desired predetermined minimum space is left between the garage inner wall and the car front bumper. This desired spacing is even more difficult to achieve when one parks one's car by backing it into the garage.

Various guide devices have been devised to enable drivers to overcome this problem, but so far as I am aware, no simple uniformly effective means for doing this exists that is also adapted for inexpensive manufacture, easy installation, and wide applicability.

A principal object of this invention is to provide a simple mechanical parking guide that insures uniformly consistent results without requiring any special skill on the part of the driver.

Another principal object of this invention is to provide a parking guide that utilizes the familiar "stop" sign as an aid in stopping one's car, on parking in his garage, precisely where it is desired in terms of a predetermined spacing from the garage inner end wall and regardless of whether the car is driven forwardly to park it, or is backed into parking position.

Other objects of the invention are to provide a garage parking guide device that is of few and simple parts, that can be readily adjusted to vary the desired spacing between the bumper of the parked car and the garage end wall, and that is economical of manufacture, simple to install, and long lived in operation.

In accordance with this invention, a car parking guide device is provided comprising a hex-shaped member that simulates the familiar "stop" sign and that is mounted on the garage inner end wall in spaced relation therefrom and at a level and location that is in substantial alignment with the vehicle operator's line of sight from his automobile. The sign member has a window opening formed in its midportion in which a slat is mounted for swinging movement about a horizontal axis at its midportion, with the slat being balanced such that under the action of gravity, it is disposed substantially edgewise to the plane of the sign. The slat bears the word "stop" on its normally downwardly facing surface, and its other surface is engaged by an arced arm of a feeler member pivotally mounted at the rear of the sign that includes a shank adapted to be engaged by the vehicle bumper such that as the bumper is advanced toward the wall after engaging the feeler member, the slat is tilted into alignment with the plane of the sign, in which position the word "stop" is readily visible to the driver, and which indicates that the desired spacing of the bumper from the wall has been achieved. The support for the sign permits adjustment of the sign toward and away from the wall to permit variance of the spacing between the automobile bumper and the garage inner wall that is desired.

Other objects, uses, and advantages will be obvious or become apparent from a consideration of the following detailed description and the application drawings.

In the drawings:

FIG. 1 is a front view of the guide device as it would be viewed by a vehicle operator from the driver's seat, except that the lower portion of the device feeler member, which ordinarily would be obscured by the end of the automobile, is illustrated;

FIG. 2 is a view substantially along line 2—2 of FIG. 1 showing the normal position of rest of the critical parts of the device in full lines, and indicating in dashed lines the positions these parts assume when the driver has moved his vehicle to the positions where he should stop movement toward the garage end wall;

FIG. 3 is a view substantially along line 3—3 of FIG. 1;

FIG. 4 is a rear view of the guide device, with the lower portion of its feeler member being omitted;

FIG. 5 is a side view of a clamp element that forms a constructional feature of the device;

FIG. 5 is a fragmental view, partially in section, illustrating a structural detail; and FIG. 7 is a fragmental side elevational view illustrating an optional extension for the feeler member of the device.

However, it is to be distinctly understood that the specific drawing illustrations provided are supplied primarily to comply with the requirements of the Patent Code, and that the invention is susceptible of other embodiments which are intended to be covered by the appended claims.

Reference numeral 10 generally indicates the parking guide of this invention, which comprises a sign member 12 of generally hexagonal configuration, in conformity with the familiar highway "stop" sign. Sign member 12, which may include suitable decorative border indicia 14, is formed with a window opening 16 in the midportion thereof in which is mounted for free pivoting movement, a slat member 18 having a surface or face 20 bearing letter warning indicia 22 in the form of the word "stop," and a rearward surface 24 which is engaged by feeler device 26 to move the slat 18 between the two positions indicated in FIG. 2 as the car is being parked.

In the form shown, slat 18 has affixed to its rear surface 24 a pivot rod 28 secured in place by a pair of clamp devices 30 and 32 that are in turn clamped against the slat surface 24 by the respective screw and nut devices 34 and 36 (each of which comprises a screw 38 passing through the slat and the respective clamp devices 30 and 32 for threaded engagement with the respective nuts 40). The respective ends 42 and 44 of the pivot rod 28 are similarly clamped to the rearward surface 13 of the sign member by clamp devices 46 and 48 clamped against the side 13 of the sign member by screw and nut devices 50 and 52 that are constituted similar to screw and nut devices 34 and 36, as indicated by corresponding reference numerals.

The clamp devices 30 and 32, 46 and 48 are identical, each taking the form shown in FIG. 5, wherein it will be seen that each such device comprises a clamping member 54 comprising an arced portion 56 adapted to receive the pivot rod 28 and a planar portion 58 against which the respective nuts 40 are turned on the respective screws 38 to clamp the pivot rod 28 against the slat surface 24. The arced portions 56 of clamp devices 30 and 32 are formed to bear firmly against pivot rod 28 to clamp it against surface 24 of slat 18, whereby rotation of rod 28 relative to the slat 18 is prevented. The ends 42 and 44 of rod 28 are of reduced thickness, whereby the arced portions 56 of clamp devices 54 are shaped to loosely engage the pivot rod 28 at its said ends 42 and 44, respectively, so that rod 28 and slat 18 will freely pivot as a unit relative to sign member 12. The reduced ends 42 and 44 each terminate at a shoulder 57 with the shoulders 57 being spaced apart the length of slat 18 and the rod 28 being centered on the slat 18 so that shoulders 57 are aligned with the slat end 61 (see FIG. 6). Shoulders 57 prevent the slat from moving endwise of rod 28 into overlapping relation with sign 12 (which would prevent the desired pivotal movement), and washers 59 received over the respective pivot rod 28 ends 42 and 44 are interposed between the ends 61 of slat 18 and sides 63 of opening 16 maintain the desired clearance between the slat and the window side edges 63.

It is desired that when the sign member 12 is disposed in its normal upright position, as when mounted on a garage end wall 60 in the manner suggested in FIG. 2, the slat member 18 be disposed substantially edgewise to the line of sight of the driver working the guide device 10, with the surface 20 of the slat member 18 facing downwardly so that the driver cannot readily make out the word "stop." In the present invention embodiment, this is achieved by the particular arrangement that is employed to clamp the pivot rod 28 to the slat member 18, it being observed that the screw and nut devices 34 and 36 are on one side of the pivot rod 28 and the pivot rod 28 is itself on one side of the slat member 18, that is, its rear side 24, with the result that the slat member 18 under the action of gravity normally takes substantially the slightly upwardly inclined full line position that is shown in FIG. 2.

The sign member 12 in the form shown is secured to the garage inner end wall 60 by adjustable bracket device 62, which comprises a first pair 64 of bracket arms 66 and 68 having their respective ends 70 and 72 angled laterally thereof and secured to the sign member 12 by the respective screw and nut devices 74 and 76, which are similar in character to those previously described, as indicated by corresponding reference numerals.

The mounting device 62 further comprises a second pair 78 of brackets arms 80 and 82 having their respective ends 84 and 86 appropriately fixed to mounting plate 88, as by employing suitable screws 90 and 92. Mounting plate 88 is affixed to the wall 60 in any suitable manner.

The ends 94 and 96 of the respective arms 66 and 68, and the ends 98 and 100 of the respective arms 80 and 82, are received in telescoping relation in the manner indicated in FIG. 3, and a plastic sleeve 102 or the like proportioned to frictionally slide over the telescoping bracket arm end portions receives them to hold the respective arms against displacement once the sign 12 has been positioned to provide the predetermined spacing that is desired by the driver.

As indicated in FIG. 3, the bracket arms 66 and 68 are spaced apart, as at 103, to receive the bracket arms 80 and 82, and feeler device 26 is mounted in the space 103, and between the respective arms 66 and 68.

The feeler device 26 comprises feeler member 104 having an elongate dependent shank 106 and a hooked end 108. In the form shown, feeler member 104 receives the shank 110 of screw 112, with the screw shank 110 also passing through arms 66 and 68 and being secured in place by suitable nut 114 applied to the shank 110. The screw shank 110 is proportioned so that feeler member 104 is freely received over same for ready centering in the full line position of FIG. 2 under the action of gravity, and the feeler member shank 106 is proportioned so that it moves freely in the space 102 and between members 66 and 68. In the form shown, the feeler member shank 106 is formed with a flattened portion 116 that is perforated to receive the shank 110 of screw 112.

The arced portion 120 of the feeler member 104 that defines hooked end 106 is preferably proportioned relative to the axis about which feeler member 104 pivots such that in the position of rest (the full line position of FIG. 2), the terminous 122 of the hooked end 108 rests on the surface 24 of slat member 18, and if the feeler member 104 is pivoted too far counterclockwise of the showing of FIG. 2, the terminous 122 thereof clears the forward corner 124 of window opening 16 to avoid digging into the sign member 12 or bending feeler member 104, with slat member 18 merely swinging clockwise past coplanar relation with sign 12.

In use, the device 10 is applied to a garage inner end wall 60 in the manner indicated in FIGS. 2 and 3, and at a position where it can be readily observed by the automobile driver as he enters his garage, and at an elevation such that the upper portion of his car's front or rear bumper will engage the end 130 of shank 106 (depending on which way the driver chooses to move his car into his garage). The pairs of bracket arms 64 and 78 are disposed relative to each other to position the shank 106 of the feeler member from the wall 60 such that when the shank 106 is engaged by the approaching car bumper and moved to the dashed line position of FIG. 2, the car bumper will be disposed at the desired predetermined spacing from the wall 60.

It will thus be seen that when the device 10 is mounted as indicated, and the driver brings his car into the garage, he will see the sign 12 with the slat 18 disposed as indicated in full lines in FIG. 2 and thus will not be able to see the word "stop" that appears on its surface 20. The driver moves his car on into the garage, slowing down as he approaches the end wall 60 to bring his bumper into contact with the feeler member shank 106. Once contact is made, further inward movement will swing feeler member 104 counterclockwise, whereby its terminous 122 presses downwardly on the surface 24 of slat 18 and moves it toward and to the dashed line position of FIG. 2, wherein the slat is disposed in coplanar relation with the sign 12, its face 20 having been lifted into full view. In this position the word "stop" is fully readable, and the driver knows that his car should be stopped to provide the predetermined bumper distance from the wall 60.

In the event that the driver brings his car too close to the wall, the feeler member 104 merely continues to pivot counterclockwise of FIG. 2, and further movement in this direction will cause the end termnious 122 to enter and pass through window opening 16; in such position, the slat 18 will have moved clockwise beyond coplanar alignment with sign 12, and the driver will thereby know that he should back off his car to achieve the coplanar relation shown in FIG. 2 if he wishes to have the right bumper distance from wall 60.

The sign 12, slat 18 and mounting plate 88 may be made of any suitable plastic, wood, or metallic material while bracket arm pairs 64 and 78 as well as feeler member 104 are ordinarily made of suitable metallic substance. Sleeve 101 is preferably formed from a plastic tubing of a suitable diameter.

The device 10 is preferably mounted at a height above the garage floor such that the lower end 130 of shank 106 will ride over the top of the bumper in the event that the car is moved so far forward beyond the indicated stopping position of FIG. 2 that feeler terminous 122 will pass below the window shoulder 124. This will permit ready disengagement of the shank 106 from the bumper when the car is moved away from the wall 60. If desired, device 10 can be mounted at a higher elevation by applying an extension to shank end 130 of the feeler, such as the plastic tube 132 shown in FIG. 7.

The front surface 13 of the sign member 12 and surface 20 of slat 18 are preferably made a color that will contrast suitably with the letter froming the word "stop". For instance, the letter may be white and the surfaces 13 and 20 colored red, with the indicia 14 being white.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A guide device for parking a land vehicle at a predetermined distance from a wall, said device comprising:
   a sign member,
   means for mounting said sign member in an upright position adjacent the wall,
   said sign member having a window opening,
   a slat mounted in said opening for pivotal movement about an axis extending parallel to the plane of said sign member when said sign member is in its said upright position,
   said slat having opposed faces with one of said faces bearing warning indicia,
   said slat being biased to assume a position substantially out of the plane of said sign member wherein said one face is substantially edgewise to an observer facing said sign member,
   a pivotally mounted feeler member,
   said feeler member including a lower depending shank and an upper actuating arm directed toward said slat and proportioned such that movement of said shank relative to said sign member when engaged by the vehicle thrusts said feeler member arm against said slat to move same into substantial alignment with said sign member with said face thereof facing forwardly of said sign member, thereby indicating to the observer that the vehicle is at the predetermined distance from the wall.

2. A guide device for parking a land vehicle at a predetermined distance from a wall, said device comprising:
   a sign member,
   means for mounting said sign member in an upright position adjacent the wall,
   said sign member having a window opening,
   a slat mounted in said opening for pivotal movement about a horizontal axis extending parallel to the plane of said sign member when said sign member is in its said upright position,
   said slat having opposed faces with one of said faces bearing warning indicia,
   said slat being balanced to assume under gravity a position substantially out of the plane of said sign member wherein said one face is substantially edgewise to an observer facing said sign member,
   a feeler member mounted behind the sign member for pivotal movement about a pivotal axis parallel to said horizontal axis,
   said feeler member including a lower depending shank proportioned to be engaged by the vehicle on approaching the wall and an upper actuating arm above said pivotal axis directed toward the other face of said slat and proportioned such that movement of said shank relative to said sign member when engaged by the vehicle thrusts said feeler member arm against said slat other faces to move same to dispose said slat in substantial alignment with said sign member with said one face thereof facing forwardly of said sign member, thereby indicating to the observer that the vehicle is at the predetermined distance from the wall.

3. A guide device for parking a bumper equipped land vehicle whereby the vehicle bumper will be disposed at a predetermined distance from a wall of a garage or the like, said device comprising:
   a sign member,
   means for mounting said sign member in an upright position adjacent the wall,
   said sign member having a window opening,
   a slat mounted in said opening for pivotal movement about a horizontal axis extending parallel to the plane of said sign member when said sign member is in its said upright position,
   said slat having opposed faces with one of said faces bearing warning indicia,
   said slat being balanced to assume under gravity a position substantially out of the plane of said sign member wherein said one face faces downwardly and is substantially edgewise to an observer facing said sign member,
   a feeler member mounted behind the sign member for pivotal movement about a pivotal axis parallel to said horizontal axis.
   said feeler member including a lower depending shank assuming a vertical position under gravity and proportioned to be engaged by the vehicle bumper on approaching the wall and an upper actuating arm above said pivotal axis directed toward the other face of said slat and proportioned such that movement of said shank relative to said sign member when engaged by the vehicle bumper and moved toward the wall presses said feeler member arm against said slat other face to move same to dispose said slat into substantial alignment with said sign member with said one face thereof facing forwardly of said sign member, thereby indicating to the observer that the vehicle bumper is at the predetermined distance from the wall.

4. The guide device set forth in claim 3 wherein:
   said feeler member arm substantially engages said other face of said slat between said horizontal axis and the edge of said slat facing said feeler member when said feeler member shank is in its vertical position, and disposing said slat at an acute angle relative to said sign member.

5. The guide device set forth in claim 4 wherein:
   said feeler member arm is of hook shaped configuration arcing in the direction of said slat.

6. The guide device set forth in claim 5 wherein:
   said feeler member arm hook shaped configuration is proportioned relative to said pivotal axis of said feeler member such that movement of said feeler member shank toward said wall beyond said predetermined distance indicating position passes the slat engaging terminous of said arm through said sign member window opening for lost motion relative to said sign member.

7. The guide device set forth in claim 3 wherein said means for mounting said sign member comprises:
- a first pair of bracket arms secured in substantial side-by-side relation and at like ends to said sign member below said window opening and projecting rearwardly of said sign member,
- a second set of bracket arms secured in substantial side-by-side relation and at like ends to a bracket member and projecting forwardly of said bracket member,
- said sets of arms having their projecting ends received in telescoping relation,
- a tubular member frictionally received over the telescoping portions of said ends for retaining them in assembled relation,
- and means for securing said bracket member to the wall.

8. The guide device set forth in claim 7 wherein: said feeler member is pivotally secured between said first set of bracket arms for its said pivotal movement,
said predetermined distance from the wall being adjustable by moving said first set of bracket arms relative to said second set of bracket arms and longitudinally thereof.

References Cited
UNITED STATES PATENTS

| | | | |
|---|---|---|---|
| 1,981,188 | 11/1934 | Pavitt | 116—28 |
| 2,849,816 | 9/1958 | Locke | 40—125 H |
| 3,219,972 | 11/1965 | Williams | 340—61 |
| 3,261,321 | 7/1966 | Mandl | 116—28 |

LOUIS J. CAPOZI, Primary Examiner

U.S. Cl. X.R.

40—125; 94—1.5; 116—63; 340—61